United States Patent

[11] 3,631,968

| [72] | Inventor | Charles W. Ward<br>Wortley Avenue, Swinton, Mexborough, Yorkshire, England |
|---|---|---|
| [21] | Appl. No. | 21,271 |
| [22] | Filed | Mar. 20, 1970 |
| [45] | Patented | Jan. 4, 1972 |
| [32] | Priority | Mar. 19, 1969 |
| [33] | | Great Britain |
| [31] | | 14,485/69 |

[54] CONVEYOR BELT CLEANING APPARATUS
4 Claims, 2 Drawing Figs.

| [52] | U.S. Cl. | 198/230 |
|---|---|---|
| [51] | Int. Cl. | B65g 45/00 |
| [50] | Field of Search | 198/188, 230; 74/230 |

[56] References Cited
UNITED STATES PATENTS

| 2,794,540 | 6/1957 | Sinden | 198/230 |
|---|---|---|---|

FOREIGN PATENTS

| 1,066,949 | 10/1959 | Germany | 198/230 |
|---|---|---|---|
| 873,307 | 7/1961 | Great Britain | 198/230 |
| 942,497 | 5/1956 | Germany | 198/230 |

*Primary Examiner*—Edward A. Sroka
*Attorney*—Lackenbach & Lackenbach

ABSTRACT: Conveyor belt cleaning apparatus which can be fitted to the frame structure of a conveyor and which is adjustable to suit different installations, includes a scraper which will extend across the belt, opposite ends of the scraper being connected to respective carriers, respective fixing brackets which can be secured in alignment to the frame structure on opposite sides of the belt, the connection between the fixing brackets and the carriers permitting relative movement about the axis of alignment of the fixing brackets, positioning means (for example an apertured quadrant) to which a lever secured to at least one of the carriers can be releasably secured in any one of a plurality of different positions to fix the position of the carriers relative to the fixing brackets about the axis of alignment, there being provision (for example by way of a spigot and socket connection) for interengagement of the brackets with the positioning means in any one of a plurality of different angular positions.

CONVEYOR BELT CLEANING APPARATUS

The invention relates to conveyor belt cleaning apparatus and has for its object to provide an improvement therein. In particular, the invention relates to conveyor belt cleaning apparatus of the type comprising a scraper which in use extends transversely of the belt with the apparatus attached to a fixed mounting or mountings, normally to frame structure of the conveyor.

Such apparatus at present in use normally has to be designed and fabricated to suit the particular conveyor installation with which it is to be used, and the object of the invention is to provide apparatus which is of more universal application in that it is adjustable to suit different installations.

According to the invention, there is provided a conveyor belt cleaning apparatus, including a scraper assembly opposite ends of which are connected to respective carriers, respective fixing brackets which can be secured in alignment to frame structure of the conveyor on opposite sides of the belt, means for connecting the fixing brackets to the carriers so as to permit relative movement therebetween about an axis of alignment of the fixing brackets, at least one positioning means to which a lever secured to at least one of the carriers can be releasably secured in any one of a plurality of different positions to fix the position of the carriers relative to the fixing brackets about the said axis, the brackets and the positioning means having provision for interengagement in any one of a plurality of different angular positions. The provision for interengagement of the bracket with the positioning means preferably consists of a spigot and socket connection having a non circular portion on the fixing bracket. The positioning means may be a quadrant or other part of a semicircle having a plurality of equidistant holes interengageable with an aperture in the lever by way of a peg. The ends of the scraper assembly are preferably connected to their respective carriers by means of leaf springs. Preferably, also, the scraper assembly includes a pair of scraper members which can be brought into an operative position alternately.

In order that the invention may be fully understood and readily carried into effect, the same will now be described by way of example only with reference to the accompanying drawings, of which:

Figure 1:
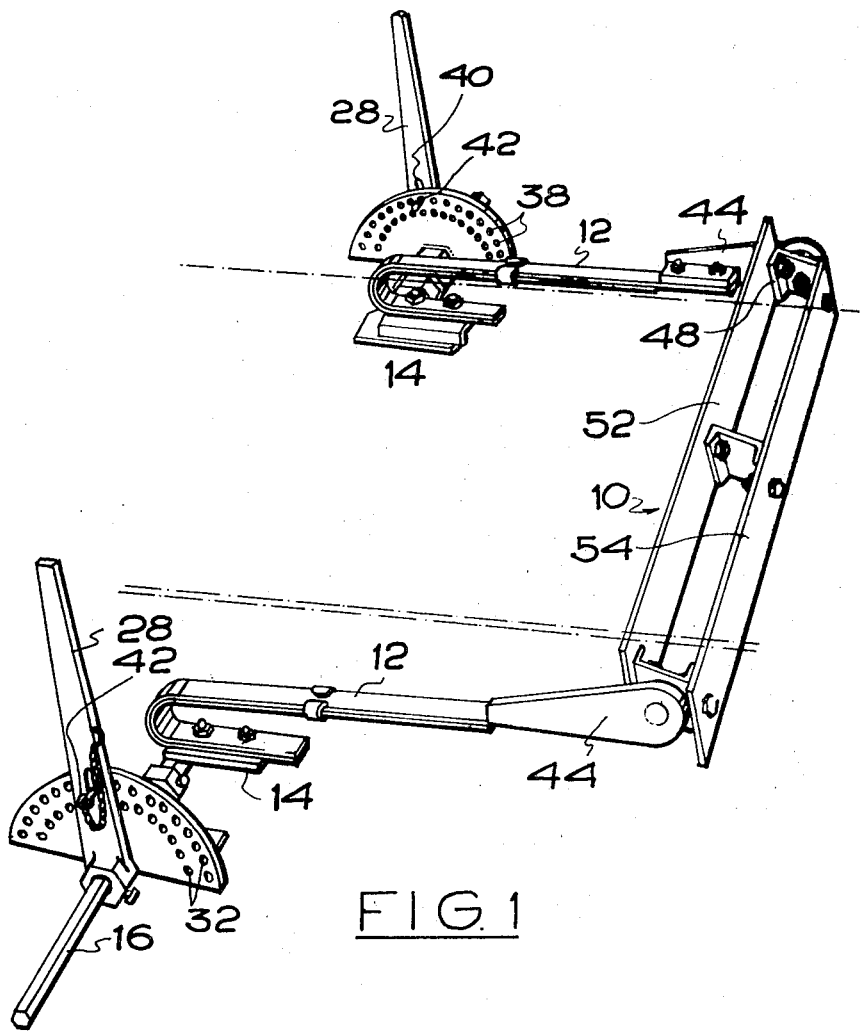
FIG. 1 is a perspective view of apparatus embodying the invention.
Figure 2:
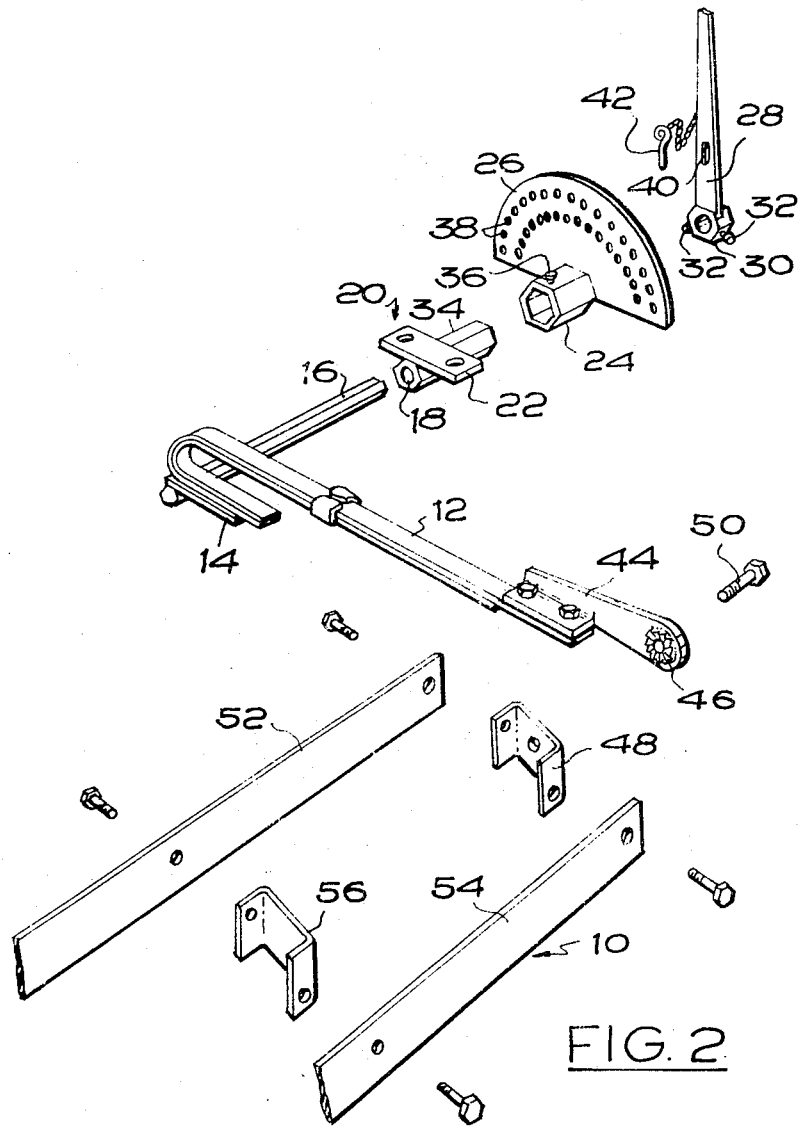
FIG. 2 is an exploded view of the apparatus.

Referring now to the drawings, a conveyor belt cleaning apparatus includes a scraper assembly generally indicated 10 resiliently mounted at its opposite ends by respective leaf springs 12 so as to bear against the underside of the belt (shown in chain-dotted lines).

The leaf springs are mounted at their ends remote from the scraper assembly on respective carriers 14 which are welded to respective stub shafts 16 of hexagonal cross section, and said stub shafts extend rotatably through plain cylindrical bores 18 of respective fixing brackets 20 provided with apertured plates 22 which can be bolted to fixed frame structure (not shown) of the conveyor. The stub shafts 16 also extend rotatably through hollow boss portions 24 of respective quadrant members 26 and at their ends remote from their carriers 14 are provided with handles 28. Said handles are provided with boss portions 30 made of hexagonal tube so that they can be engaged nonrotatably on the stub shafts and retained by screws 32.

The bores 18 of the fixing brackets 20 extend axially through portions of hexagonal bar 34 which project laterally of said brackets and which provide mountings for the hollow boss portions 24 of the quadrant members. Said hollow boss portions of the quadrant members are made of hexagonal tube which can be nonrotatably engaged with the portions of bar 34 so that each quadrant member can be attached to its fixing bracket in any one of six positions, to suit the particular application, and retained thereon by means of a screw 36. The quadrant members are each provided with two sets of holes 38 spaced apart on different pitch circle radii, as shown, and the handles 28 are provided with respect slots 40, the arrangement being such that a locating peg 42 can extend through a slot 40 in one of the handles and through any one of the holes 38 in its associated quadrant according to the direction in which it is desired that the leaf spring concerned should extend, that is to say, according to the location of the belt relative to the fixing bracket.

Each leaf spring has a return bend portion by means of which it is bolted to its carrier. In this way the effective length of the spring is greater than if the spring was straight (assuming the same distance between the scraper assembly and the axis about which the carriers can be adjusted). At its end remote from its carrier each leaf spring is bolted to a scraper mounting bracket 44.

The scraper mounting brackets 44 are provided with serrated flanges 46 between which the scraper assembly 10 is mounted. The scraper assembly includes a pair of channel members 48 which are also provided with serrated flanges engaging those of the mounting brackets 44. Bolts 50 extend through the serrated flanges of the channel members and mounting brackets, the arrangement being such that the scraper assembly can be rotatably adjusted about the axes of said bolts. Respective scraper members 52 and 54 are bolted to opposite flanges of the channel members. A spacer 56 is provided to brace the scraper members together midway of their length.

Each scraper member is offset relative to the other so that, as drawn, the scraper member 52 projects above the scraper member 54. The scraper member 52 is therefore the operative one but if the scraper assembly is turned about the axes of the bolts 50 the scraper member 54 can be brought into the operative position.

Thus there is provided belt cleaning apparatus which has been found to be very versatile and extremely simple to mount on different types of belt conveyor. By reason of the resilient mounting of the scraper assembly the apparatus has also been found to be very efficient in use and has caused the minimum of belt wear.

Various modifications may be made without departing from the scope of the invention. For example, it is not essential for the scraper assembly to be mounted on leaf springs. Furthermore, it is not essential for there to be two quadrant members; if both carriers were connected together by means of a transverse shaft, a single quadrant member could be provided. Similarly, although it is preferable for the scraper assembly to be provided with two scraper members the scope of the invention is such that it will embrace an arrangement having only a single scraper member.

What I claim is:

1. Conveyor belt for cleaning apparatus comprising a scraper assembly, a pair of carriers, a pair of leaf springs connecting the ends of said scraper assembly with the respective carriers, a stub shaft fixed to each of said carriers, a pair of fixing brackets through which said stub shafts freely extend, said fixing brackets being adapted to be secured to frame structure of a conveyor on opposite sides of a belt, positioned means having a spigot and socket connection with the fixing brackets, into engagement means for the spigot and socket connection between the positioning means and fixing brackets comprising, in turn, noncircular positions for fixedly interengaging said brackets and positioning means in any one of a plurality of different angular positions, a lever secured with each of said stub shafts, and means for enabling the levers to be interengaged with said positioning means in any one of a plurality of selected positions so that the opposite ends of said scraper assembly are independently mounted and each end can be preloaded against the conveyor belt independently of the other.

2. Conveyor belt cleaning apparatus defined in claim 1 wherein the noncircular portions of said interengagement means of the spigot and socket connections are of regular polygonal shape so that the positioning means can be connected to the fixing brackets each in any one of a plurality of positions.

3. Conveyor belt cleaning apparatus defined in claim 2, wherein each positioning means comprises in turn a plate having a plurality of holes substantially equidistantly spaced apart along a plurality of radially spaced apart arcs and each lever has an elongated aperture having a width substantially the same as the diameter of said holes extending from the innermost to the outermost extremes thereof which can be brought into alignment with any one of the holes and further comprising a pair of pegs for interengaging said levers with said plate by engagement of said pegs in the apertures in said levers and selective holes of said plates.

4. Conveyor belt cleaning apparatus defined in claim 3 wherein said scraper assembly comprises, in turn, a pair of scraper members extending generally oppositely of one another and being offset one above the other, and further comprising adjustment means for enabling selective rotation of said scraper assembly about the longitudinal axis thereof so that the scraper members can be brought into an operative position alternately.

* * * * *